Dec. 11, 1973        W. R. ADAMS        3,778,336

HEAT RESISTANT AND OXIDATION RESISTANT STRUCTURES

Original Filed Sept. 17, 1965

INVENTOR.
WHITNEY R. ADAMS
BY
ATTORNEY

United States Patent Office 3,778,336
Patented Dec. 11, 1973

3,778,336
HEAT RESISTANT AND OXIDATION
RESISTANT STRUCTURES
Whitney R. Adams, Northshire, Wilmington, Del., assignor to Scott Paper Company, Philadelphia, Pa.
Continuation of abandoned application Ser. No. 488,019, Sept. 17, 1965. This application May 8, 1969, Ser. No. 824,751
Int. Cl. B32b 3/12
U.S. Cl. 161—168    18 Claims

ABSTRACT OF THE DISCLOSURE

Porous cellular structures comprised of an infusible resin, which may or may not be pyrolyzed or carbonized wholly or in part, and which may be a coating upon a skeletal structure which is the pyrolyzed product of the material comprising an original structure, the infusible resin having a coating thereon of a suitable heat-resistant and oxidation-resistant resin which may be either thermoplastic or thermosetting. A method for treating cellular structures to form the above structures from materials which fuse or melt at relatively low temperatures, that is, below about 400° F. such that the finally evolved product will assume substantially the same physical or structural shape of the relatively low fusion temperature material and yet will provide a structure which is relatively stable and possess greater strength at higher temperatures, that is, on the order of 700° F. or higher. In the method, a first basic structure having a desired configuration and comprised of material having a low fusion or deterioration temperature is coated at even lower temperatures with an infusible resin which is capable of being cured at a temperature lower than the relatively low fusion or deterioration temperature of the material comprising the first basic structure. The resulting coated structure is then subjected to elevated temperatures so that the basic structure is pyrolyzed and carbonized leaving a stronger, high-temperature-resistant structure substantially in the image of said first basic structure. The above structure is then coated with any one of a number of high temperature-oxidation-resistant organic resins having a fusion temperature and a viscosity such that they will adhere to a structure and maintain an integral oxidation-resistant coating at temperatures of up to 700° F. and even higher.

---

This application is a continuation of Ser. No. 488,019 filed Sept. 17, 1965, now abandoned.

This invention relates to porous structures having a high strength-to-weight ratio and a method for forming them and more particularly to structures characterized by the above and having improved resistance to oxidation at elevated temperatures, and to a novel method for forming such structures.

There is a very urgent need for new high strength structures having a high strength-to-weight ratio and capable of support at elevated temperatures for use in many applications. Particularly important are structures which can resist oxidation or decomposition by air at such high temperatures, for example, in the neighborhood of 750° F. This need is especially apparent in the field of aerospace and aircraft construction and is also present in the area of chemical processing such as where filtering of a hot gaseous medium is involved.

At present, it is well-known to construct a variety of open-celled, reticulated network-type structures from any one of a large variety of organic resin materials such as polyurethane foam. In addition, there is a well-developed body of knowledge concerning the formation of many other types of three-dimensional cellular structures, such as honeycombs of various design, and similarly, many other cellular geometric structures. These latter structures can be formed from a variety of materials including glass fiber sheets, paper and different metal foils. However, by far one of the most inexpensive cellular structures seem to be reticulated polyurethane foam which can be produced in the form of relatively large pieces and in practically any shape and the pore size of which can be varied over a wide range with a fair degree of control.

However, it is also apparent that structures such as the above often have insufficient strength for many uses at normal temperatures and, furthermore, are very lacking in the required strength for many uses at elevated temperatures, that is, on the order of 450° F. and higher. According to present methods of forming even the more exotic metallic honeycombs, it is extremely expensive and difficult to design such structures in such a way as to allow their use at temperatures in this range, and even these structures will not withstand higher temperatures, that is, up to about 750° F. and higher. Such metal honeycombs are commonly formed by utilizing epoxy resin to cement and bond together crimped sheets of metal to form the individual cells. These structures are unreliable at temperatures in the neighborhood of 700° F., since the epoxy-metal bond tends to weaken and lose its strentgh characteristics at that temperature. To form such honeycomb structures by welding or other metal fabrication techniques is extremely expensive and often impossible where a cell of a small cross-section is desired.

The present invention provides a method for treating cellular structures formed from materials which fuse or melt at relatively low temperatures, that is, below about 400° F., such that the finally evolved product will assume substantially the same physical or structural shape of the relatively low temperature material and yet will provide a structure which is relatively stable and possesses greater strength at higher temperatures, that is, on the order of 700° F. or even greater.

Briefly, a first basic structure having a desired configuration and comprised of material having a low fusion or deterioration temperature is coated at even lower temperatures with an infusible resin which is capable of being cured at a temperature lower than the fusion or deterioration temperature of the material comprising the first basic structure. The resulting coated structure is then subjected to elevated temperatures so that the basic structure is pyrolyzed and carbonized leaving a stronger, high-temperature-resistant structure substantially in the image of said first basic structure.

It has also been a problem with structures operating at such temperatures to prevent oxidation or decomposition thereof due to the presence of oxygen in the air and its rapid reactance with most structural materials at such temperatures. There are many applications where it is desirable to have a structure having a high strength-to-weight ratio and of a porous nature which structure will be resistant to oxidation at temperatures of about 750° F. In accordance with the method of the invention, this problem is overcome by coating the above with any one of a number of high-temperature-oxidation-resistant organic resins, a large number of which have been, and some of which are still being, developed. The fusion temperatures and viscosity of these resin are such that they will adhere to a structure and maintain an integral oxidation-resistant coating at temperature of up to 700° F. and higher.

It has been previously extremely difficult, if not impossible, to coat porous structures having the configuration described above with organic resins of any type. This difficulty has been caused by the inability of the above coating processes to place a uniform coating over the entire surface of the structure. For example, when dipping techniques were employed, although it was sometimes possible to coat the interior of a structure, the coating would be quite uneven since the material in this liquid form suitable for dipping had a dendency to run off of the structure or to gather at certain portions more than at other portions. In addition, there was no way to accurately control the thickness of such coating. The other more commonly employed method of coating such objects in a fluidized bed of particulate organic resin material was incapable of placing a coating on the structural surface in the interior of such a structure. In many cases, coating structures such as a polyurethane foam structure with high temperature-oxidation-resistant resins such as polytetrafluoroethylene or a fluorinated ethylene-propylene copolymer was impossible since the structure being coated would collapse at the fusion temperature of these resins.

However, by the novel method of the invention, it is now possible to place uniform coatings of high-temperature-oxidation-resistant organic resins, such as the above-mentioned, over porous structures without regard to the depth of such structures. It is also possible by the method of the invention to coat relatively low fusion temperature structures such as polyurethane foam with these high-temperature-oxidation-resistant resins by means of an intermediate coating of a thermosetting resin which is capable of resisting high temperatures and assumes the configuration of the basic polyurethane structure for support at temperatures above the fusion temperature of these high-temperature-oxidation-resistant resins.

Thus, the present invention provides a material which is light weight, porous, and posseses relatively high strength at high temperatures, and furthermore, is resistant to oxidation at temperatures of about 750° F. It will be readily apparent to those concerned with new materials and their application that the method of the present invention provides a new and novel material which can be employed successfully in a variety of applications where prior materials failed and demonstrating a performance which, in many cases, is superior to that of structures previously employed. This material is in the form of a porous structure having a plurality of open cells, all of which are open to the atmosphere, comprised largely of an infusiable resin, which may or may not be pyrolyzed or carbonized wholly or in part, and which may be a coating upon a skeletal structure which is the pyrolyzed product of the material comprising the original structures. On the outside of this first coating or pyrolyzed structure is a second coating of a suitable heat-resistant resin which may be either thermoplastic or thermosetting as will be described subsequently.

Therefore, it is an object of the present invention to provide a process for forming high strength cellular or porous structures for use at relatively high temperatures.

It is a further object of the prsent invention to provide a process for forming high strength cellular or porous structures for use at relatively high temperatures from relatively low strength structures which have relatively low fusion or decomposition temperatures by inexpensive and uncomplicated fabrication methods.

It is an additional object of the invention to provide such structures having anisotropic properties.

It is a further object of the invention to provide porous structures having open intercommunicating passages or cells, the material forming which has an interior of a carbonized product resulting from the at least partial pyrolysis of the material forming a basic structure, that is, material which is self-supporting above 200° F. and pyrolyses above 500° F., an intermediate layer of an infusible resin which may be at least partially pyrolyzed, and an exterior of a heat-resistant and oxidation-resistant organic resin.

It is a further object of the invention to provide such structures having isotropic properties.

It is still a further object of the invention to provide a structure comprised of a carbonized matrix of interconnecting strands and nexus forming reticulated randomly oriented and interconnecting cells, which strands are coated with an epoxy resins which has been at least partially pyrolyzed, over which epoxy resin coating is an additional coating of a heat-resistant and oxidation-resistant organic resin.

Additional objects and advantages of the invention will be apparent from the following detailed description thereof, taken in conjunction with the following drawings in which.

One method of the present invention involves temporarily attaching particulate infusible resin coating material upon the surface of a porous structure formed from material having a given fusion temperature and having open intercommunicating cells or passages. One way of accomplishing this is to wet the structure with a binding liquid and to deposit particulate resin coating material thereupon as by dusting techniques, for example. The coating material has a fusion temperature when in the uncured condition below the fusion temperature of the material comprising the porous structure.

The article coated thereby is then heated to a temperature which is above the fusion temperature of the particulate coating material and which is below the decomposition temperature and fusion temperature of the material forming the original porous structure until the coating material is fused over the surface of the structure into a substantially contiguous coating on its surface. The coating material is maintained at the above temperature until the material is cured into its infusible state and into a rigid self-supporting condition. The resulting structure is then subjected to a temperature which is above the pyrolyzation temperature of the material forming the basic porous structure. The above coating procedure is repeated with a heat-resistant and oxidation-resistant organic resin at a temperature below 750° F. This results in an article having a shape substantially the same as the shape of a basic structure coated originally but formed of a material whose melting point is above 200° F. and which at least partially pyrolyzes above 500° F., the first layer of which is formed of a different material having higher temperature characteristics, that is, good structural strength at temperatures of up to 700° F. and higher, and which may be at least partially pyrolyzed but which is infusible, and the next layer or exterior coating of which comprises a heat-resistant and oxidation-resistant organic resin which is retained upon the structure at temperatures up to at least 750° F.

Figure 1:
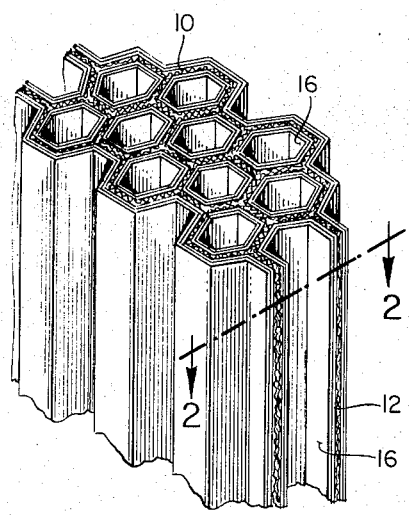
FIGS. 1 and 3 are enlarged views in perspective of a variety of porous structures having open intercommunicating cells, which structures are typical of those which may be formed in accordance with the method of the invention.
Figure 3:
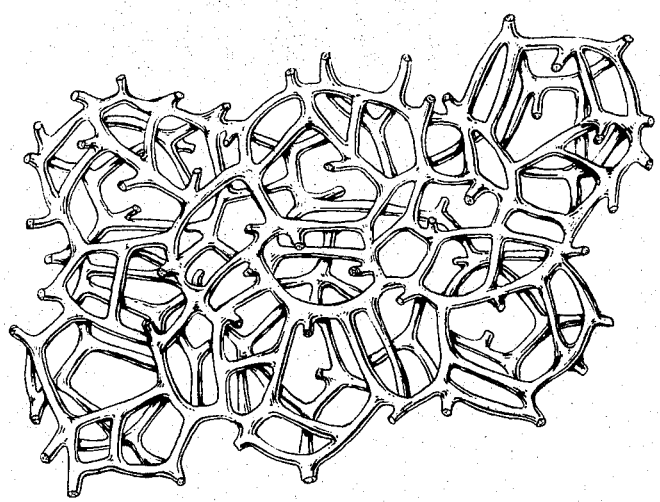

Initially, it should be understood that a large variety of structures may be coated by the method of the invention. A few examples of typical structures which may be successfully coated by means of the method of the invention are shown in FIGS. 1 and 3. The invention is very useful in coating structures of a porous nature having open interconnecting cells or passages, some of which may be extremely long, relative to the cross-sectional area of the cells, that is, on the order of up to 24 inches or longer for a cell size of 1/16 square inch or less.

The cross-sectional areas of such passage or cells may also vary quite widely, the only basic limitation being the degree to which the coating material can be formed into a fine powder in order to be deposited on the interior of a structure as described above. However, it should be understood that the method of the invention could also be practiced on structures having much simpler shapes than those shown in the drawings, including even planar surfaces.

FIG. 1 shows a simple honeycomb structure, the cells of which could be greatly extended in length compared to the cross-sectional area of the cells but basically representing a hexagonal honeycomb structure. FIG. 3 illustrates the structure of a relatively new basic material known commonly as reticulated polyurethane foam. These foams and methods of their preparation and formation are thoroughly disclosed in U.S. Pat. 3,171,820. These foams are basically three-dimensional porous structures and may be considered as three-dimensional honeycombs comprised of integrally interconnecting strands forming an isotropic skeletal outline of a multitude of polyhedrons whose faces are polygonal.

Obviously, various methods may be employed to temporarily attach and retain the powdered coating material upon the surface prior to fusion or melting of such coating material over the surface of the structure. One means successfully employed has been to coat the structure with a binding liquid by dipping or spraying. The amount of such binding liquid is not critical, it being sufficient merely to wet the surface of the structure and retain the desired amount of powdered resin material. Water is preferably employed as the wetting or binding liquid because of its ready availability, low cost and good physical characteristics such as polarity. In ordinary use, water which is available is sufficiently impure that it contains a minute quantity of different materials which serve as binders. These binders help to retain the particles of coating material upon the structure after the structure is heated and the liquid is volatilized. In addition, the structure to be coated normally contains sufficient foreign matter to provide such binding agents normally as a result of the nature of their manufacture or chemical impurities in the material forming such structure.

However, it is recognized that often pure structures which have been cleaned or otherwise kept free of foreign matter may be hydrophobic. Furthermore, if pure water is applied to such structures to retain the coating powders, upon volatilization of the water by heat, no material is left as a binder. Surprisingly enough, in instances where powdered coating material is applied to and retained on such a structure by pure water and the structure is subjected to a temperature sufficient to fuse the coating material prior to jerky movement or extensive transport of the structure, very satisfactory performance has been achieved.

In some cases, however, it has been found desirable to incorporate a small amount of binding agent such as a liquid adhesive, for example, a water soluble latex-type adhesive, especially in those cases where the powder coated structure is to be transferred prior to fusion. Another satisfactory adhesive is a 5% solution of Flexbond 150, a copolymer emulsion manufactured by Air Reduction Chemical and Carbide Company, New York. Wetting agents may be employed in the binding solution to lower the surface tension and the contact angle of the solution so as to increase wettability of the structure and evenness of the coating. Such agents may comprise, for example, one of the Pluronic Series of wetting agents manufactured by Wyandotte Chemical Company, Michigan and may be used alone or in combination with the adhesives as additives to the binding solution. It will be apparent that many types of compositions or solutions could be employed which would serve both as wetting solutions and binding agents and all of these are considered to be within the scope of the invention. Some additional specific agents which have been employed with success will be presented in the subsequent examples.

As will be evident from subsequently presented Example I, it is sometimes necessary to employ an adhesive which has dry tack on the surface of the porous body or basic structure. This may be required because of the reactivity of a particular infusible resin powder with the particular binding liquid employed and may also be desirable in some cases to provide a thinner coating on the structure than can be obtained with a liquid binding agent or adhesive. This is due to the fact that when a liquid is employed, a layer of resin powder having a thickness of several particles can be formed since the liquid is drawn up through the first adhered articles to the coated surface by capillary action providing means for attaching additional particles. In the case of dry tack adhesive coating, the layer of resin powder can be restricted to a thickness of generally one particle since the particles must essentially contact the actual surface of the coated basic structure in order to be retained thereon. One way of obtaining an adhesive coating having dry tack is to coat with an adhesive solution or emulsion by means of the above described method and then to allow the adhesive to dry prior to dusting with resin powders. Many of the water soluble latex-type adhesives will operate satisfactorily in this manner.

The coating materials employed in the primary coating of the basic structures include a variety of commonly used thermosetting resins such as epoxy resins as well as a number of recently developed high temperature polymers such as polyimides, the polypyrones, and the polyoxazoles. The particular size of these materials is dictated by practical considerations of each application. Thus, it can be realized that it if exceptionally large particles are attached to a structure, the resulting coating will be less even and smooth than that obtained by the use of coating materials of small particle size. It is also important that the particles be sufficiently small to penetrate into the interior of relatively thick cellular structures having deep passages. In this regard, it should be pointed out that there is a relationship between the pore size of the structure being coated and the particle size of the coating resin which will be apparent one skilled in the art.

The particle size of the thermosetting resin has also been found to have an effect on the thickness of each coating applied to a structure. For example, if the particle size of a thermosetting resin is large, a thicker coating will result on the structure assuming that the binding liquid or adhesive means is the same in each instance. As will be described subsequently, in the case of phenolic thermosetting resins, it is important to apply a series of thin coatings rather than one thick coating due to the evolution of water vapor as a phenolic thermosetting resin transforms from the "B" stage into the "A" or fully cured stage. The coating must be sufficiently thin to allow such water to diffuse from the structure into the atmosphere.

One requirement of the infusible polymeric or thermosetting resin coating is that it be at least partially infusible and be capable of passing through a curing stage so that it may be fused onto a structure at a temperature from about 200° F. to 500° F. and cured to a stable state, whereupon it assumes and maintains rigid characteristics at even high temperatures. It can comprise any of the standard accepted commercial and industrial polymers that, in their final state, possess infusibility. For example, the phenol-aldehyde resins, commonly known as the Bakelite-type resins, are satisfactory. These resins comprise those derived from a large family of phenols including phenol itself as well as the homologues of phenol such as the cresols, the xylenols, the resorcinols, the catechol, p,p'-di-hydroxydiphenyl-2,2-propane, etc. and the reactions with aldehydes such as formaldehyde, acetaldehyde, glyoxal, acrolein, furfuraldehyde or compounds engendering aldehyde such as trioxane paraformaldehyde, hexanethylenetetramine and the like. The thermosetting epoxy resins as well as the other copolymers of epoxy resins with the phenolic resins, with the urea resins, the melamine resins, with the polyamide, with the butadieneacrylonitrile rubbers, etc. are also satisfactory and can be used in this process. Also satisfactory are the furane resins derived from furfuryl alcohol, furfuryl aldehyde or mixture of furaldehyde with furfuryl alcohol alone or in the presence of phenols. Some of the new high-heat resistant polymers which in their final state are infusible are particularly suitable for use in the process of this invention, such as the broad class of polybenzimidazoles of the general formula,

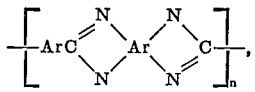

the arylene polyimides, of the general formula

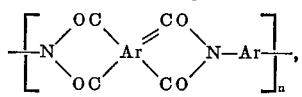

the poly Schiff bases of the general formula

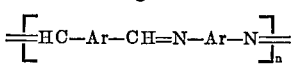

wherein Ar represents a bivalent aromatic group such as
—$C_6H_4$—, —$C_6H_4O$—$C_6H_4$—, —$C_6H_4$—$C_6H_4$—, —$C_6H_4CH_2C_6H_4$—, —$C_6H_4SC_6H_4$—, —$C_{10}H_6$—, etc.

It is also possible in certain instances and with certain types of thermosetting resins to employ a thermosetting resin in the "B" stage in the form of a liquid. It will be apparent to one skilled in the art that in this case the use of an adhesive or binding solution could be avoided and the basic porous structure could be merely immersed in the liquid "B" stage thermosetting resin and subsequently subjected to heat sufficient to cure the resin upon the structure. One resin which can be obtained in this form and employed satisfactorily in this manner is a solventless liquid phenolic "B" stage resin. Solid "B" stage phenolic resins in alcohol or acetone solutions are also satisfactory. Of the newer high heat resistant polymers, dimethyl formamide or dimethyl acetamide solutions of the reaction product of pyromellitic anhydride and meta or para phenylene diamine are particularly useful.

The infusible resins used in the practice of this invention may be members of the class selected from the three-dimensional thermosetting resins of which the phenolic resins and the epoxy resins are illustrative examples, and the nonmelting aromatic polycarbonyl derivatives of which the polyamides, polyimides, polyazines, polyoxazoles, polypyrones, etc. are illustrative examples.

Since the coating in its final state is infusible and insoluble, it is necessarily applied to the reticulated member while it is in the intermediate soluble, fusible, or soluble and fusible state, that is, uncured; and thereafter cured or converted to the infusible state by any suitable means, such as by heat, catalysts or heat and catalyst.

After the structure has been wet with a binding liquid, infusible resins materials in a powdered or particulate form as described above are applied to the surface of the structure by any one of a number of known dusting techniques. The excess material may be left on or removed depending upon the thickness and uniformity of the coating desired.

The temperature to which the structure is subject after temporary attachment of resin particles should be above the fusion temperature of the particulate coating material employed and below the decomposition temperature and fusion temperature of the material from which the basic structure is formed. It is desired that the basic structure retain strength sufficient to support itself until the coating upon its surface becomes sufficiently rigid to increase the strength of and support the structure. In the case of thermosetting resins, such as epoxies, this temperature should be above the curing temperature, that is, above the temperature at which the epoxy resin passes into the "B" stage and irreversibly becomes directed toward a full cure.

Normally, curing is accelerated and occurs in a shorter period of time when conducted at a higher temperature as is understood by those skilled in the art. Obviously, the temperature at which this fusing can be performed depends to a large extent upon the characteristics of the material forming the basic structure. Similarly, the temperature at which the composite structure is cured and the length of time of such curing depends to a large extent upon the characteristics of the coating substance applied. In any event, a contiguous coating is formed by the fusion or melting of the coating resin particles into one another so as to form a universal and continuous layer of resin material over the entire surface of the structure.

After the coated structure has been subjected to a temperature for a time period sufficient to cure the coating resin into a rigid layer capable of supporting the structure, the temperature to which the structure is exposed may be elevated considerably in order to at least partially pyrolyze the basic structural material and reduce the weight of the entire structure. Depending upon the temperature to which the composite structure is subjected and the nature of the coating substance, the structure formed by the rigid coating may also be partially or completely pyrolyzed and oftentimes carbonized into a rigid, high strength, coated structure possessing good strength characteristics at elevated temperatures considerably higher than the temperatures which the original structure will withstand.

The structures produced in accordance with the method of the invention described thus far may now be successfully coated in a simple manner by any one of a number of high temperature-oxidation-resistant organic resins such as Teflon. As previously pointed out, the fusion points of these materials are so high that the coating of structures having the configuration desired and constructed of materials having a low fusion temperature and decomposition temperature has been impossible in most cases since the structure would normally collapse in most cases during the coating process. However, the structures now presented in the form of pyrolyzed structures coated with at least partially pyrolyzed and carbonized infusible resin, possess a large amount of strength and require only that they be protected from oxidation at high temperatures.

In accordance with the methods of the invention, this protection is provided for by applying an oxidation resistant coating upon the exterior surface of this pyrolyzed structure by the same procedure and in substantially the same manner as described previously for the coating of the basic structure with an infusible resin. Thus, particles of the desired high temperature-oxidation-resistant organic resins are temporarily attached to the surface of the pyrolyzed structure and this structure is then subjected to a temperature sufficient to fuse the high temperature-oxidation-resistant organic resin material into a smooth contiguous coating or protective exterior layer over the surface of the structure. It will then be apparent to those skilled in the art that the resulting structure is resistant to oxidation at high temperatures while possessing and demonstrating a relatively large amount of strength as a structural member at such temperatures.

Among the high temperature-oxidation-resistant organic resins which may be employed satisfactorily as protective exterior coatings in accordance with the invention are fluorocarbon polymers such as polytetrafluoro ethylene (TFE) and fluorinated ethylene-propylene copolymer (FEP) and polyvinylidene fluoride. Other resins which may be satisfactorily employed in accordance with the invention would include some of the more recently developed polyimides, polybenzimidazoles and polyphenyl ethers. Basically, any oxidation-resistant resin may be employed which will pass through a fluid stage at temperatures below about 700° F. and which will flow over a surface to form a smooth contiguous coating and possess at such temperatures sufficient viscosity to cling to the surface even though the coating resin itself may be slightly plastic or fused at the upper range of these temperatures.

The physical characteristics of structures produced in accordance with the method of the invention depend to a large extent upon the design of the basic structure. That is, the structure illustrated by FIG. 1 would result in largely anisotropic parts being exhibited with the greatest strength being perhaps in a direction parallel to the longitudinal axis of the cells shown. It will be apparent that high-temperature-oxidation-resistant structures having the configuration illustrated by FIG. 3 would possess generally isotropic properties and find further uses in a variety of application. With structures similar to that of FIG. 3, the method of the invention is especially significant in that large masses of material can be formed by the process of the invention at a very low cost and in a large variety of easily controlled pore size and thicknesses. As mentioned in the above referenced patent, the pore size and material thicknesses of polyurethane foam can be closely controlled and regulated.

The invention provides a variety of structures having open intercommunicating passages or cells comprised of materials having an interior of which is a carbonized or pyrolyzed product of the material forming the basic structure, an intermediate layer of a coating material which may be simply cured or at least partially pyrolyzed and an exterior protective coating layer of an oxidation-resistant organic resin. Details of the structure can be seen from the exploded sectional views of FIGS. 1 and 3 shown by FIGS. 2 and 4, respectively, which illustrate construction features which are typical of the large variety of products capable of being formed by the method of the invention.

Figure 2:
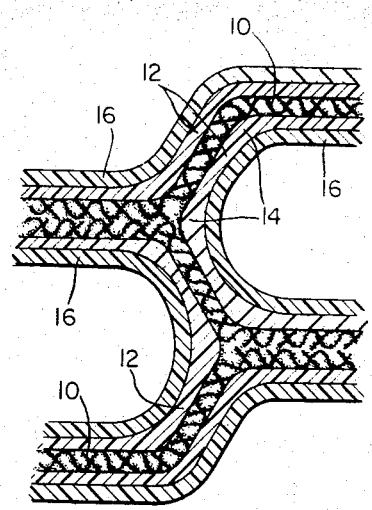
FIG. 2 is an enlarged segmented sectional view taken along line 2—2 of FIG. 1, illustrating the nature of the resulting structure.

Referring now to FIG. 1 of the drawings, there is shown in perspective a simple honeycomb structure formed in accordance with the method of the invention. The material comprising the walls of the cells forming the honeycomb structure has an interior 10 which is a woven fiber glass cloth impregnated with an organic polymer such as polyurethane. The layer 10 has an intermediate coating 12 on both surfaces which coating 12 comprises a thermosetting resin, and an exterior coating 16 of a high temperature-oxidation-resistant organic polymer. Prior to application of the outer contiguous coating 16, the composite honeycomb structure has been subjected to a temperature sufficient to pyrolyze the polyurethane so as to leave an interior 10 of woven fiber glass cloth bonded at randomly spaced points to the outer layers 12 of epoxy resin. In addition, the cloth 10 has a small amount of organic residue which is the product of pyrolysis of the polyurethane. The layer 12 has also been at least partially pyrolyzed. FIG. 2 illustrates an enlarged segmented sectional view of a honeycomb structure of FIG. 1 and illustrates more clearly the nature of the interior layer 10 and the exterior layers 12.

Another very significant feature of the invention is illustrated by FIG. 2. It will be noticed that the regions of the coating 12 directly adjoining any corners of the structure or places where several surfaces intersect at an angle to each other forming what otherwise would be a sharp corner, have an enlarged buildup 14 of coating material 12 which tends to round off such corners and provide an outer surface to the coating 12 which is relatively smooth and free from sharp changes in direction or surface features. This same surface is then followed and enhanced by the coating 16 of a heat resistant resin.

As is well understood by those familiar with structural design, this feature provides that drastically increased strength will be had by the resulting structure since weaknesses inherent in sharp corners or surface details are eliminated. This effect has even more significant value when it is realized that even when materials such as the resin impregnated fiber glass cloth are employed which have large variations in sheet thickness or cross-section, these are compensated for by the above mentioned tendency of the thermosetting coating resin to flow evenly over and fill up any valleys or depressions which would otherwise cause weakness and present a smooth contiguous outer surface to the structure when applied in accordance with the method of the invention. This feature may also be important when products of the invention are used for filtering or various chemical applications wherein flow through the structure is desired to be uniform and with as little resistance as possible.

FIG. 3 is a perspective view of a body of reticulated polyurethane foam which has been first coated with a thermosetting resin in accordance with the method of the invention and the polyurethane core was pyrolyzed out. Then an exterior protective coating of a high temperature-oxidation-resistant organic resin was applied as a contiguous layer over the pyrolyzed, thermosetting resin coated, foam structure. Basically, the structure comprises a plurality of integrally interconnecting strands and nexus forming an isotropic skeletal outline of a polyhedron whose faces are polygonal. The above network forms, after pyrolysis, a matrix of miniature interconnected passageways since the interior of the entire structure is essentially hollow while the exterior coating of thermosetting resin is intact and provides the strength required by the structure. However, it has been found that in the process of pyrolysis, as the polyurethane achieves fusion temperature and begins to pyrolyze, it creates pressure as well as increases in volume so that it forms breaks through the network by rupturing the strands and nexus at distributed points allowing some of the products of pyrolysis to escape from the interior.

After application of the protective coating 16 of high temperature-oxidation-resistant organic resin to the structure, the breaks or ruptures in the strands and nexus are repaired resulting in an unbroken network of passageways.

Figure 4:
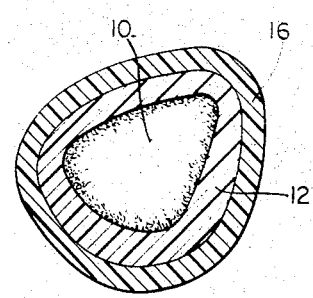
FIG. 4 is an enlarged cross-sectional view of one strand of the structure shown in FIG. 3.

FIG. 4 illustrates in greater detail the nature of the structure of a strand and shows a cross-sectional view of a typical strand. As can be seen, 10 designates the cavity which was previously occupied by the solid polyurethane strand and 12 illustrates the thermosetting resin coating which now comprises one of the substances forming the structure and presented structural integrity. The inner surface of the layer 12 has adhered to it a gossamery or filamentary organic matter which comprises the infusible residue or products of pyrolysis from the polyurethane. On the top layer 12 is the protective exterior layer or coating 16 of a high temperature-oxidation-resistant organic resin material. It is believed that in some instances, an additional layer exists between the polyurethane and the layer 12 of the thermosetting resin and comprises a reaction product of these two substances with each other.

In the case of a structure having the configuration shown in FIG. 3, the thickness of the coating upon each strand seems to increase toward the ends of each strand adjacent to respective nexus compared with the thickness in the middle of the strand. Furthermore, there is a concentration of coating material about each nexus of the skeletal structure. This seems to be caused to a large extent by surface tension of the coating thermosetting resin in the fused liquid state prior to its curing into a hard thermoset coating. It also will be exhibited by similar properties of the high temperature-oxidation-resistant organic resin coatings. Also, in some instances, some of the smaller spaces or windows of the structure defined by a plurality of interconnecting strands have a solid sheet of film of fused thermosetting resin or high temperature-oxidation-resistant resin material cross them, joining such strands. However, it should be thoroughly understood that the resulting structure will always be considerably porous and open-celled except in instances where extremely thick coatings are placed on the structure.

The strength of structures of the invention depends to a large extent on the strength of the particular infusible resin employed as a coating material in its overcured state. At certain temperatures, that is, below the fusion temperature of the outer coating of high temperature-oxidation-resistant resin, this outer coating will provide some strength also. Thus, for example, a block of reticulated polyurethane foam coated with an epoxy resin in its properly cured state will be stronger at ambient temperature than would such a structure at ambient temperature which had its interior pyrolyzed out and the epoxy resin at least partially pyrolyzed. However, the same block of properly cured coated reticulated polyurethane foam is very weak at high temperatures of about 400° F. while such a structure in the pyrolyzed state will have a substantially greater strength at an even higher temperature of about 700° F. and above and, furthermore, will not be subject to thermal degradation or oxidation during lengthy use at that temperature.

The following examples illustrate several specific embodiments of the invention and are not intended to limit the scope of the invention in any way.

EXAMPLE I

A piece of reticulated polyurethane foam (Scott Industrial Foam, Scott Paper Company) measuring 2" x 2" x 1", having approximately ten pores per linear inch and weighing 2.077 g. was immersed in an ethylene-vinyl acetate (EVA) emulsion (Flexbond, Grade 150, Air Reduction Chemical and Carbide Company) containing 5% total solids. This adhesive possesses good dry tack. After draining the sample, excess solution was shakes off and the sample was air dryed with a fan at room temperature. The sample was then placed in a shallow tray, the bottom of which was covered with a light layer of powdered B-stage epoxy resin (Corvel ECA-1283, The Polymer Corporation, Reading, Pa.) having a varied particle size of less than 60 mesh. The foam sample was then thoroughly dusted with additional resin powder from above, using a scoop, considerable excess powder being used. It was then lifted from the tray, tapped to remove excess powder, inverted, and the dusting process was repeated. The sample was next held edgewise in the tray and further dusted with powdered resin in at least two positions. In this manner, the powder, falling through the structure held at varying angles, came in contact with the tacky adhesive-coated foam surface and became temporarily attached thereto. The foam was then carefully transferred to a circulating hot air oven where it was subjected to a temperature of 446° F. for fifteen minutes to accomplish fusion and curing of the resin powder coating on the surface of the foam structure.

After cooling, the sample weighed 5.126 g. The sample was again immersed in 5% Flexbond emulsion and the above process repeated to obtain a second coat of resin. The double-coated sample weighed 7.069 g. representing a coating of 240% on the basis of the weight of the original foam sample.

The sample was returned to the oven and heated for two hours at 572° F. to pyrolyze it. Weight after pyrolysis was 5.475 g., representing a loss of 1.570 g. due to pyrolysis.

The structure was treated with a 5% Flexbond emulsion as described above, except that it was not air-dryed. The dampened or wetted sample was dusted as described above with powdered fluorinated ethylene-propylene copolymer ("Teflon" FEP, E. I. du Pont de Nemours and Company, ground by Liquid Nitrogen Processing Company, Malvern, Pa. "Liquinite" Coating Powder F-160) having a varied particle size of less than 50 mesh. It was then heated in an electric furnace for ten minutes at 698° F. to fuse the resin, cooled and given a second coat of the same resin in the same manner. Final weight was 10.855 g., a gain in weight of 5.380 g. representing a coating of 98.5% on the basis of the pyrolyzed structure.

The resulting porous structure retained its high strength-to-weight ratio at 752° F. and, because of the protective Teflon coating, resisted oxidation by air at that temperature. Such a material is useful when used as a component in composite structures for aerospace use in the air foils and fuselages of supersonic aircraft. In rocket and spacecraft applications the material retains its strength at the temperature extremes and in the gamma radiation levels found in space.

Since Teflon is immune to attack by most chemicals and solvents, the structure is of value in the petroleum and chemical processing industries as filter and tower packing. Its resistance to hot salt water makes it useful as a demister in evaporators used for the desalinization of sea water.

Example II

A piece of reticulated polyurethane foam (Scott Industrial Foam, Scott Paper Company) measuring 6" x 6" x 1" having approximately ten pores per linear inch was coated three successive times with powdered epoxy resin (#64–518 silicon modified epoxy coating powder, Dow-Corning Company) using in each instance the method described in Example I. The coating was 431% based on the original substrate weight.

A piece was cut from this sample, measuring 2¼" x 2¼" x 1" and having a weight of 11.5754 g. It was then pyrolyzed at 842° F. for one hour in a nitrogen atmosphere after which it weighed only 6.0727 g., demonstrating a loss in weight of 5.5027 g. or 52% of the unpyrolyzed structure.

The structure was next flooded with powdered 60 mesh polybenzimidazole in the B-stage (Celanese Chemical Company special sample) using the method of Example I and using 5% Flexbond air-dried as the adhesive system. The powdered sample was transferred to a metal box where it was maintained in a nitrogen atmosphere during the ensuing fusing and curing operations. B-stage polybenzimidazole softens at a relatively low temperature of about 248° F. As the structure rises while curing, the substance emits gases. If the curing is reached too suddenly, the gases become entrapped and cause bubbles to form in the finally cured resin. To preclude this, the sample must be heated slowly to permit diffusion of gas from the molten resin before final solidification occurs. The sample was heated gradually over a two-hour period from 194° F. to 446° F. after which it was allowed to remain at 446° F. for an additional 16 hours to facilitate degassing. It was then found to weigh 7.4960 g. It was then returned to the oven under nitrogen and heated from 446° F. to 707° F. over a one-hour period and held at 707° F. for two hours for final cure. The B-stage polybenzimadazole resin oxidizes slowly in air at room temperature. At higher temperatures, the rate of oxidation increases rapidly and renders the polymer useless. Therefore, prior to final cure, it is necessary to exclude air and to substitute an inert atmosphere such as nitrogen. The finished coated sample weighed 7.3742 g. The resulting porous structure is operational at conditions encountered in aerospace applications. The outer coating of polybenzimidazole has a strength greater than that of steel at 842° F. and is ideal for use as a skeletal structure for retaining ablative materials in re-entry shields and missile nose-cones.

EXAMPLE III

A piece of honeycomb material about 3" in diameter and ½" thick (Hexcel Products, Inc., Berkeley, Calif.) made from glass fiber cloth impregnated with a phenolic resin and having hexagonal cells, the opposing faces of which cells were approximately 3/16" apart, was used as a substrate. The sample initially weighed 4.5791 g. After pyrolysis in a nitrogen atmosphere for one hour at 450° C., the sample weighed 3.7787 g., representing a loss of 0.8004 g.

The pyrolyzed structure was next dipped in a 5% Flexbond adhesive emulsion, drained, shaken and air-dryed. The sample was then placed in a tray with the hexagonal channels in a vertical position and flooded with 60 mesh polybenzimidazole in the B-stage until the channels were completely filled with powder. Such filling of the cells causes lateral pressure of powder on the honeycomb walls and results in heavier pickup and better adhesion. The structure was then slowly lifted free of the pan and tapped gently to remove excess powder. It was then heated in an inert atmosphere using the heating cycles described in Example II. Final weight was 5.4124 g. which is an increase of 1.6337 g., representing a coating of 43% of the weight of the original structure.

The resulting structure is most useful in aerospace use as a reinforcing structure in composites, and radar shields where high strength and low weight are required under high temperature conditions.

EXAMPLE IV

A piece of honeycomb material about 3" in diameter and 1¼" thick (Hexcel Products, Inc., Berkeley, Calif.) made from glass fiber cloth impregnated with a phenolic resin and having hexagonal cells, the opposing faces of which cells were 3/16" apart, was used as a substrate. The sample weighed 9.3525 g. After being pyrolyzed in a nitrogen atmosphere for one hour at 842° F., the sample weighed 7.7352 g., demonstrating a loss of 1.6173 g.

The pyrolyzed structure was next dipped in a 5% Flexbond adhesive emulsion, drained, shaken free of excess liquid and air-dryed. The sample was then placed in a tray and thoroughly dusted with powdered polyvinylidene fluoride ("Kynar," Grade 301, Pennsalt Chemicals Corporation) composed of loosely agglomerated particles having a diameter of approximately 5 microns using the same procedure as described in Example III. The structure was then slowly lifted free of the tray and tapped gently to remove excess powder. It was then heated in contact with air for 15 minutes at 500° F. followed by 15 minutes at 572° F. A second coat was applied, heating for 15 minutes at 590° F. and a final coat was applied and heated for 15 minutes at 608° F. Weight of the structure was then 17,8761 g. illustrating a gain in weight of 10.1409 g. representing a coating of 131% of the pyrolyzed substrate.

The resulting structure has the advantages listed in Example III and, in addition, is capable of withstanding chemical attack by the powerful oxidation agents and fuels (solvents) used in liquid fuel rockets.

From the above it can be seen that the invention provides a method for preparing a large variety of new and novel structures and in a manner which allows the fabricating of structures from materials having excellent physical properties in the configuration of and by the use of structures made of very inexpensive materials which have quite undesirable properties for the particular applications involved. Furthermore, the invention provides a variety of new structural products which have good strength characteristics and resistance to oxidation at relatively high temperatures and which can be further treated for and shaped for advantageous application in numerous industrial areas. It will be apparent from the above that numerous modifications can be made in the method and products without departing from the spirit and scope of the invention.

What is claimed is:

1. A three-dimensional network of strands integrally interconnected by thickened nexus at spaced-apart points so as to form the isotropic skeletal outline of a multitude of polyhedrons whose faces are polygonal, common to a polyhedron adjacent thereto, open to the atmosphere, and free from membraneous material, said strands and nexus being of composite construction and formed of an interior which comprises a carbonized product of polyurethane, an intermediate layer which comprises an at least partially pyrolyzed product of a thermosetting resin which has a fusion temperature when in the uncured condition below the fusion temperature of polyurethane, and an exterior layer of a high temperature-oxidation-resistant organic resin.

2. A structure according to claim 1, wherein said organic resin is polytetrafluoro ethylene.

3. A structure as defined in claim 1, wherein said organic resin is a fluorinated ethylene-propylene copolymer.

4. A structure as defined in claim 1, wherein said organic resin is a polyimide.

5. A structure as defined in claim 1, wherein said organic resin is a polybenzimidazole.

6. A structure as defined in claim 1, wherein said organic resin is a polyphenyl ether.

7. A three-dimensional isotropic network of strands integrally interconnected by thickened nexus at spaced-apart points so as to form the isotropic skeletal outline of a multitude of polyhedrons whose faces are polygonal, common to the polyhedron adjacent thereto, open to the atmosphere, and free from membraneous material, the material comprising said strands and nexus being of composite construction and formed of an exterior layer of a high temperature-oxidation-resistant organic resin as a protective coating upon an intermediate layer which comprises an at least partially pyrolyzed product of a thermosetting resin, and a thin coating on the surface of said intermediate layer opposite the surface adjacent said exterior layer which coating is the pyrolyzed product of polyurethane, the interior of said strands and nexus being essentially hollow.

8. A process for forming a composite, porous structure consisting of a plurality of open-ended, elongated cells of polygonal cross-section comprising the steps of:
    (a) subjecting a body of honeycomb material, which is made from glass fiber cloth impregnated with a cured infusible resin, to a temperature sufficient to pyrolyze said infusible resin,
    (b) temporarily attaching particulate, uncured, high temperature-oxidation-resistant organic resin to said body, and
    (c) subjecting the resulting structure to a temperature sufficient to fuse and flow said organic resin over the surface of said structure to form a uniform coating thereon.

9. A method for preparing a high temperature-oxidation-resistant structure from and in the image of reticulated polyurethane foam, comprising the steps of:
    (a) temporarily attaching particulate, uncured, thermosetting resin material over the entire surface of said polyurethane article,
    (b) heating said article to a temperature above the fusion temperature of said particulate, thermosetting resin material and below the decomposition temperature and fusion temperature of said polyurethane foam until the thermosetting resin is fused over the entire surface of said polyurethane article into a continuous coating on said surface,
    (c) maintaining the coated article at said temperature until the thermosetting resin material is sufficiently cured to be self-supporting,
    (d) subjecting the coated article to a temperature which is below the volatilization temperature of the thermosetting resin but above the decomposition temperature of the polyurethane foam thereby pyrolyzing and at least partially volatilizing the polyurethane foam,
    (e) temporarily attaching particulate high temperature-oxidation-resistant organic resin material upon the surface of said thermosetting resin material, and
    (f) subjecting the resulting structure to a temperature sufficient to fuse and flow said high temperature-oxidation-resistant organic resin for the entire surface of said structure to form a smooth continuous protective coating thereon.

10. The method in accordance with claim 9 wherein the polyurethane article is heated to a temperature between about 200° F. and 500° F. in order to fuse the particulate, thermosetting resin.

11. The method in accordance with claim 9, wherein the step of temporarily attaching the particulate, uncured, thermosetting resin material includes the step of wetting the surface of the polyurethane article with a binding liquid.

12. A method in accordance with claim 9 wherein the high temperature-oxidation-resistant organic resin is polytetrafluoro ethylene.

13. A method in accordance with claim 9 wherein the high temperature-oxidation-resistant organic resin is a fluorinated ethylene-propylene copolymer.

14. A method in accordance with claim 9 wherein the high temperature-oxidation-resistant organic resin is a polyimide.

15. The method in accordance with claim 9, wherein the high temperature-oxidation-resistant organic resin is polybenzimidazole.

16. The method in accordance with claim 9, wherein the high temperature-oxidation-resistant organic resin is a polyphenyl ether.

17. The method in accordance with claim 9, wherein the high temperature-oxidation-resistant organic resin is a polyvinylidene fluoride.

18. A process of preparing a novel resin-coated fiber reinforced expanded honeycomb core having improved high temperature resistance, which method comprises exposing a prefabricated core of expanded honeycomb cellular configuration containing a first resin readily decomposeable at a temperature of about 550° F. to a temperature of at least about 550° F. for a time sufficient to remove an amount of said resin from said core such that when replaced with a higher temperature resistant second resin the core material exhibits improved high temperature resistance, but an amount insufficient to impair the structural stability of said core, and thereafter applying to said core a coating of a second resin more resistant to degradation at a temperature of at least about 550° F. than said first resin in a concentration sufficient to improve the resistance of said core to degradation at temperatures of at least about 550° F.

References Cited

UNITED STATES PATENTS

| | | | |
|---|---|---|---|
| 2,895,948 | 7/1959 | Brinker et al. | 260—78.4 |
| 3,062,793 | 11/1962 | Eleuterio | 117—161 |
| 3,098,759 | 7/1963 | Lincoln | 117—95 |
| 3,111,396 | 11/1963 | Ball | 264—44 |
| 3,111,426 | 11/1963 | Capron et al. | 117—161 X |
| 3,244,653 | 4/1966 | Wright et al. | 260—23 |
| 3,282,897 | 11/1966 | Angelo | 260—47 |
| 3,353,994 | 11/1967 | Welsh et al. | 117—98 X |

FOREIGN PATENTS

| | | | |
|---|---|---|---|
| 1,388,818 | 1/1965 | France | 23—209.1 |

GEORGE F. LESMES, Primary Examiner

M. E. McCAMISH, Assistant Examiner

U.S. Cl. X.R.

106—41; 117—46 CC, 161; 260—2.5 R; 264—29, 44